US007640213B2

(12) United States Patent
Reunert et al.

(10) Patent No.: US 7,640,213 B2
(45) Date of Patent: Dec. 29, 2009

(54) SYSTEM AND METHOD PROVIDING RULES DRIVEN SUBSCRIPTION EVENT PROCESSING

(75) Inventors: Philip Peter Reunert, Redmond, WA (US); Jun Yin, Kirkland, WA (US); Brett Adam Tanzer, Seattle, WA (US); Naveen Kachroo, Redmond, WA (US); Bharat Shyam, Mercer Island, WA (US); Darren Mitchell, Woodinville, WA (US); Michael T. Daly, Redmond, WA (US); Todd D. Ostermeir, Kirkland, WA (US); James Francis Gilsinan, IV, Redmond, WA (US); David John Brennan, Redmond, WA (US); Carol R. Rall, Redmond, WA (US); Ram Viswanathan, Bellevue, WA (US); Murali R. Krishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/198,238

(22) Filed: Aug. 26, 2008

(65) Prior Publication Data

US 2009/0024522 A1 Jan. 22, 2009

Related U.S. Application Data

(63) Continuation of application No. 10/151,419, filed on May 20, 2002, now Pat. No. 7,418,426.

(51) Int. Cl.
*G06Q 40/00* (2006.01)

(52) U.S. Cl. .............................. 705/40; 705/39; 705/44

(58) Field of Classification Search .................... 705/40
See application file for complete search history.

(56) References Cited

U.S. PATENT DOCUMENTS

| | | | |
|---|---|---|---|
| 6,094,688 | A | 7/2000 | Mellen-Garnett et al. |
| 6,411,697 | B1 | 6/2002 | Creamer et al. |
| 6,460,082 | B1 | 10/2002 | Lumelsky et al. |
| 6,711,157 | B1 | 3/2004 | Tang et al. |
| 6,968,389 | B1 | 11/2005 | Menditto et al. |
| 6,981,029 | B1 | 12/2005 | Menditto et al. |
| 7,330,717 | B2 | 2/2008 | Gidron et al. |
| 2002/0002498 | A1 | 1/2002 | Hatakeyama |

(Continued)

OTHER PUBLICATIONS

Dan Gisolfi, "The Web Services Architect: Catalysts for Fee-Based Web Services". http://www.106ibm.com/developerworks/library/ws-arc6/(1 of 7)Nov. 19, 2001.

*Primary Examiner*—Kambiz Abdi
*Assistant Examiner*—Lindsay M. Maguire
(74) *Attorney, Agent, or Firm*—Shook, Hardy & Bacon L.L.P.

(57) ABSTRACT

The present invention relates to a system and methodology providing an automated and dynamically responsive infrastructure to support online subscription services. The system includes one or more components to coordinate and manage a plurality of services offered by multiple service providers. This can include automatically creating and managing billing accounts for customers subscribing to such services. At least one engine is provided to process multiple rules in response to subscription events that occur in connection with the services in order to facilitate service delivery. At least one rating processor is provided to process multiple rating rules in response to subscription events for currency and non-currency resources.

11 Claims, 11 Drawing Sheets

U.S. PATENT DOCUMENTS

2002/0059114 A1 5/2002 Cockrill et al.
2002/0096563 A1 7/2002 Singhal
2004/0030611 A1 * 2/2004 Byrne ........................ 705/26
2006/0019736 A1 1/2006 Amada

* cited by examiner

SYSTEM AND METHOD PROVIDING RULES DRIVEN SUBSCRIPTION EVENT PROCESSING

CROSS REFERENCE TO RELATED APPLICATIONS

This application is a Continuation of U.S. patent application Ser. No. 10/151,419, filed on May 20, 2002, Entitled "SYSTEM AND METHOD PROVIDING RULES DRIVEN SUBSCRIPTION EVENT PROCESSING". The entireties of the aforementioned applications are incorporated herein by reference.

TECHNICAL FIELD

The present invention relates generally to computer systems, and more particularly to a system and method to provide a subscription event processing architecture operative in accordance with a plurality of rules and processing engines to facilitate online billing and provisioning services in accordance with a managed object and services environment.

BACKGROUND OF THE INVENTION

Network technologies such as the Internet have provided users and other entities with virtually unlimited access to remote systems and associated applications. This type of access in many cases has become a complex maze of processes that is often offloaded to third-party systems to manage. Application heterogeneity has increased exponentially, and rapid growth has forced enterprises to develop and deploy applications ever faster—even at the expense of integration and ease of administration. Historically, enterprises generally only had to consider these issues at an internal level. In many situations however, these enterprises now have to grant external access to employees, supply chain partners, contractors and customers. Organizations that employ third-party service providers (application, network or otherwise) generally, should manage users and access rights across both their internal systems and the systems run by service providers. In some cases, provisioning systems can facilitate establishing new users' rights and privileges across multiple applications. Generally, these systems are tailored to the needs of an existing business to augment existing security practices by enabling administrators to quickly cut off terminated employees, and when necessary standards evolve, effect changes in employment status and responsibility across business partner networks. Many provisioning systems include a workflow system, a logging and audit system, a database to support the workflow and auditing tasks, and personal agents that communicate with applications to add, delete, suspend or change users and privileges. Not all provisioning systems have equal spans of control and utility, however, wherein several problems currently exist.

At the core of many systems, custom-designed models and architectures have been developed to support existing businesses and/or business practices (e.g., an electronic accounting system that can only manage accounts relating to the associated business it was designed for). These models can include inflexible rules that are configured to one particular business model or a limited subset of business activity. Thus, inflexible or hard-coded designs are not easily adaptable to newer and ever-changing technologies such as provided by the Internet and/or other type electronic services. Consequently, if new services are to be added to existing businesses, or if new packages of services are desired, extensive systems and architectural improvements are generally required to support such services.

Another related problem involves the amount of development effort that is expended when new services become available and another entity that has not developed the service desires to sell the respective service or in some cases become aware of service availability. As an example, if a vendor of a music service were to add a subsequent service such as a retail merchandise service, it is very likely that the vendor would have to develop a custom and/or new interface to support existing billing and/or accounting practices that were previously in place for the original music service. As can be appreciated, if new interfaces, software, procedures and/or business practices are required when new services are added and deployed or in many cases when new relationships are established, then development time and associated costs can become excessive.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate data driven definition, persistence, and processing by one or more engines that are designed to participate in the delivery of an online subscription service. A plurality of rules can be executed by the engines in response to external and/or internal events to determine eligibility of a customer to acquire, purchase, continue to use, and/or convert a service offering or service package offering. If a purchaser is qualified and a services offer accepted in accordance with engine processing, billing impacts and allocated resources to the purchaser are determined to enable provisioning actions such as creating, managing and maintaining a billing account for service delivery. The system supports coordinated processing of multiple rules, across the engines, in response to a set of well-defined subscription events for processing billing and provisioning actions within a single transaction, if desired. A globalized infrastructure facilitates services support in many geographical regions on a single system and/or across systems. This can include a robust permissions model that enables multiple businesses to share resources of a single system model while mitigating security concerns for private data integrity associated with a respective business entity.

In accordance with one aspect of the present invention, an online subscription architecture is provided to facilitate billing and provisioning of a plurality of accounts associated with multiple services and/or service packages offered by various service providers. Third party entities such as tenants can offer a plurality of services to customers that are described in a product catalog, wherein components of the service are stored, registered and mapped into an offering. Offerings are structured in accordance with a set of rules that are responsive to an associated set of offering events that define a subscription process for the respective service or services. In addition to configuring offers, other aspects facilitate configuration in an automated manner, such as with category and partner information, for example.

If an offering for a service is acceptable to the customer, a qualification engine is employed to determine the eligibility of the customer to purchase such services in accordance with a set of eligibility rules. Upon successful determination of eligibility and/or concurrently to the eligibility determination, a ratings engine is employed to determine costs and/or other factors in accordance with a set of ratings rules applicable to the package of services selected. A provisioning engine can then be invoked to create and manage a billings account according to a set of service delivery rules. The billings account can then be utilized to assess charge to the customer for the selected services that are offered by one or more service providers. Over the course of time, and as different events occur in relation to the services and/or accounts, the qualification engine, ratings engine, and/or provisioning engine can automatically initiate further processing based upon other rules and associated events. As an example, such events can include subscription renewals, conversions, cancellations, expirations, suspensions, billing rate changes, and/or additional purchases.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
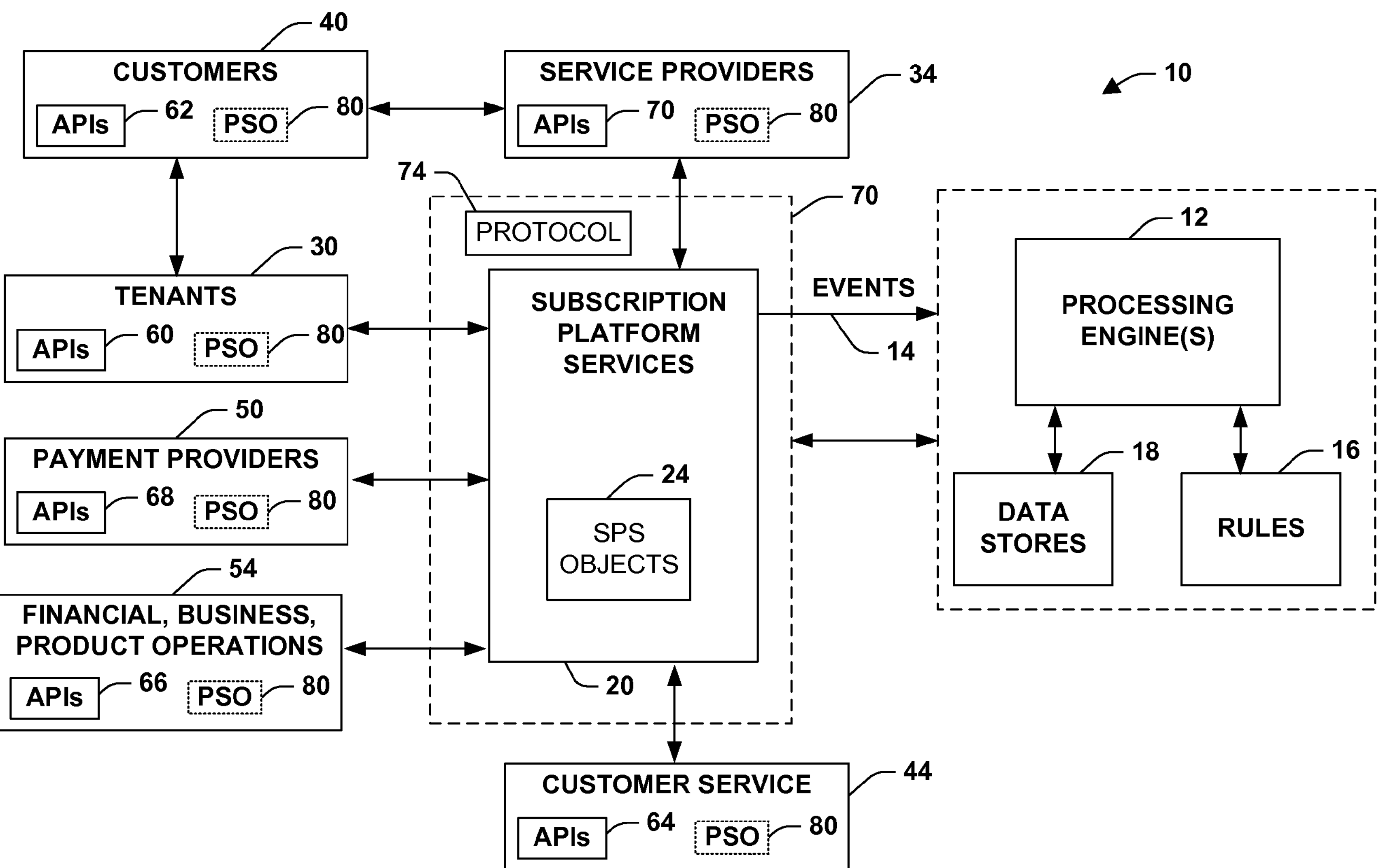
FIG. 1 is a schematic block diagram illustrating a billing and provisioning processing architecture in a distributed computing environment in accordance with an aspect of the present invention.

The present invention relates to a system and methodology providing an automated and dynamically responsive infrastructure to support online subscription services. The system includes one or more components to coordinate and manage a plurality of services offered by multiple service providers. This can include automatically creating and managing billing accounts for customers subscribing to such services. At least one engine is provided to process multiple rules in response to subscription events that occur in connection with the services in order to facilitate service delivery. A Subscription Platform Service (SPS) can operate within a managed object environment (e.g., .Net framework, other type framework or platform) to facilitate creation and provisioning of accounts associated with the subscription services, engines, rules, and/or events in accordance with billing, provisioning and/or other account activities. It is to be appreciated that the present invention can operate independently of a given software platform or framework when providing billing and provisioning services.

The present invention provides an event model framework and system for online subscriptions, wherein the event model maintains an accurate lifecycle of an online subscription with granularities to support integrated provisioning, billing, and sales validation requirements of an online subscription service management system. This can include a data driven rules definition for online subscription service sales, billing, and provisioning, for example. Rules can be defined in an interpretable manner that effect end-to-end delivery of an online subscription service and enable a rapid introduction of new subscription services. This can be achieved by modifying data stored in a configurable product catalog defining components and other aspects of a service or package of services, for example. The system generally utilizes product catalog interpretation for convenience of implementation. However, it is to be appreciated other approaches can be employed such as a compiled approach, or a just-in-time compilation model.

In another aspect of the present invention, coordination of sales, provisioning, and billing actions are taken in response to one or more events that are externally detected and/or internally driven. This adds transactional integrity to the processing of related events across one or more subsystems participating in the delivery of a subscription and/or related services. Furthermore, multiple related and/or unrelated business entities can employ a shared environment that facilitates privacy and integrity of data relating to a respective business. In one aspect, multiple tenants can reside within the system and be shielded from other respective tenants. At about the same time or concurrently, offers configured by one of the tenants can be made available to several other tenants even though the business entities themselves shared a secure and protected environment.

In addition, employing components such as a qualification engine enables customers or other entities to be pre-qualified for purchase of online subscriptions based on an extendable set of rules and/or heuristics. Moreover, the present invention includes an extensible rating rule model that can extend a plurality of balance impact rules that can be processed by a rating or impact engine employing configuration data. This facilitates scaling of the system to rapid changes that dynamically can occur in accordance with online subscription services.

Referring initially to FIG. 1, a system 10 illustrates a billing and provisioning processing architecture in a distributed computing environment in accordance with an aspect of the present invention. The system 10 provides an infrastructure to support various billing relationships between parties and entities. One or more processing engines 12 are provided that respond to external billing and provisioning events 14 and operate according to a plurality of rules 16 that are associated with a respective processing engine 12. The events 14 can include internally determined events (not shown) within the processing engines 12 and generally conform to a subscription event model. The model represents state transitions that a subscription may pass through in a subscription lifecycle (e.g., subscription for online services such as e-mail). An example of such events 14 can include: Subscription Pre-Purchase, Subscription Purchase, Subscription Sponsorship, Subscription Cancel, Subscription Disable, Subscription Enable, Subscription Convert Out Of, Subscription Convert Into, Subscription Renewal, Subscription Usage Event Report, Subscription To Expire, User Service Profile Change, Subscription Expiration, Service Allocation, Service De-allocation, Service Suspension, and Service Enable. It is to be appreciated that other such events can be defined in accordance with the present invention.

The rules 16 can include service delivery rules, qualification rules, rating rules, and/or other type rules that facilitate billing and provisioning processing in accordance with the processing engines 12. Depending on the nature of the events 14, the processing engines 12 apply a set or subset of the rules 16 that are associated with the events. For example, service delivery rules define atomic units of service to be delivered that include data about the type of service, service level delivery, and/or associated resource balance relating to performance and payment of a service. Qualification rules define eligibility requirements for purchase of a respective service. These rules can be created to restrict and/or alter purchasing of services to a limited set of users, user languages, currencies, countries, tenants, service providers, existing services and/or offerings owned, affiliation with a particular tenant, payment via a particular method, and so forth. Rating rules facilitate determining balance impacts to currency balances that result in charges and/or include non-currencies that monitor consumption and allocation of services. These rules can be defined within the scope of an individual offering to be processed in the context of the subscription event model, described above. As will be described in more detail below, one or more data stores 18 are provided to support billing and provisioning within the system 10 and related subscription/event processing by the processing engines 12.

A Subscription Platform Service (SPS) 20 is provided that includes one or more Subscription Platform Objects (SPO) 24 in order to establish and maintain billing, provisioning, and account relationships between one or more tenants 30, one or more service providers 34 and one or more customers 40. In general, the tenants 30 sell services that are performed by the service providers 34 to the customers 40, wherein the SPS 20 is employed to create and manage a respective billing account for such services. The tenant 30 offers a service or package of services (related or unrelated) to the customer 40 or consumer of the services. An offering can include an atomic unit of salable items associated with a service in the system 10. Offerings can contain collections of service delivery, qualification, and rating rules, plus multiple language and pricing descriptions for respective eligible languages, and include additional meta-data employed by the system 10. Subscriptions provide an instance of an offering that is associated with a respective end user or customer 40.

If a subscription for the service is desired, the tenant 30 retrieves credit card information or other type of billing arrangement from the customer 40, exchanges legal or contract information with the customer, and determines an amount to charge the customer on a regular or periodic basis for the service or services. The tenant 30 employs the SPS 20 to create a billing account, authorize the customer's credit card or other instrument with an associated financial institution, and notifies the service provider 34 to begin offering services to the customer 40. As services are performed by the service provider 34, the SPS 20 bills the customer's account. It is to be appreciated that other components illustrated in the system 10 can offer or sell services to the customer 40 in accordance with the present invention. For example, the service provider 34 can offer and sell services to the customer 40 without interacting with a respective tenant 30.

Other parties or entities that are involved with the SPS 20 include customer service components at 44 to provide ongoing support and management of customer accounts. Payment providers at 50 (e.g., banks, financial institutions) facilitate payment of customer accounts, whereas financial, business, and product operations aspects are illustrated at 54. Financial and business operations can employ the SPS 20 for data manipulation and analysis, if desired, whereas product operations can utilize the SPS to determine and provide product catalog offerings such as with packaged services, for example.

In accordance with one aspect of the present invention, an Application Program Interface set (API) 60-70 is provided, wherein the respective entities 30-54 can interact with the SPS 20. The API set 60-70 generally performs as an interface to the SPS 20. It is through the API set 60-70 that tenants 30, service providers 34, customers 40, customer service representatives 44, payment providers 50 and/or financial/other operations 54 access one or more features of the subscription platform service 20. For example, the API set 60-70 can expose one or more of the following aspects such as Account Management, Product Catalog Search and Manipulation, Subscription Management, User Authorization, Usage events, Online Statements/Self-Care, Customer Service Utilities, Business and Product Operations, Utilities, Events and Notifications, and/or Provisioning Support.

An Extensible Markup Language (XML) schema can be provided that defines the platform objects 24 for provisioning, billing and/or customer care. For example, the objects 24 can include Accounts, Payment Instruments, Offerings, Service Components, Subscriptions, Service Instances, Role Assignments, Permits, Resources, Billing Statement Period Information, Billing Statement Payment Information, Billing Statement Line Items, Comments, and/or Settlement Information to name possible object functionality. The entities 30-54 can also interact with the SPS 20 and/or between entities across a network 70 and via a protocol 74.

The protocol 74 can include a Simple Object Access Protocol (SOAP), although as can be appreciated other protocols can be selected. SOAP facilitates a program running in one type of operating system to communicate with a program in the same or another kind of an operating system by utilizing Hypertext Transfer Protocol (HTTP) and/or XML as components for information exchange, as an example. An optional Partner Support Object (PSO) 80 can be provided with the entities 30-54 to facilitate communications between entities and the SPS 20. For example, the PSO 80 can provide a helper interface for establishing connections to the SPS 20 and/or provide connection pooling of objects to facilitate performance. The PSO 80 generally exposes a single API such as a connect interface. After installing the PSO 80, the respective entity 30-54 can utilize the PSO for authentication, authorization, and/or other communications, if desired.

It is noted, that the components described in the system 10, may run separately on different machines or computers, wherein respective a component by itself may run on multiple machines or computers—thus providing a multi-level component distribution in a distributed computing environment. In accordance with one aspect of the present invention, a routing mechanism or protocol can be provided to handle partitioning of subscription and billing information across several machines (e.g., partitions). This facilitates processing higher levels of traffic through the system 10, yet, maintain a level of fault tolerance in the system. For example, information can be partitioned via a combination of a hashing algorithm and a database (e.g., tower) to determine which partition a particular item of information may be located.

Figure 2:
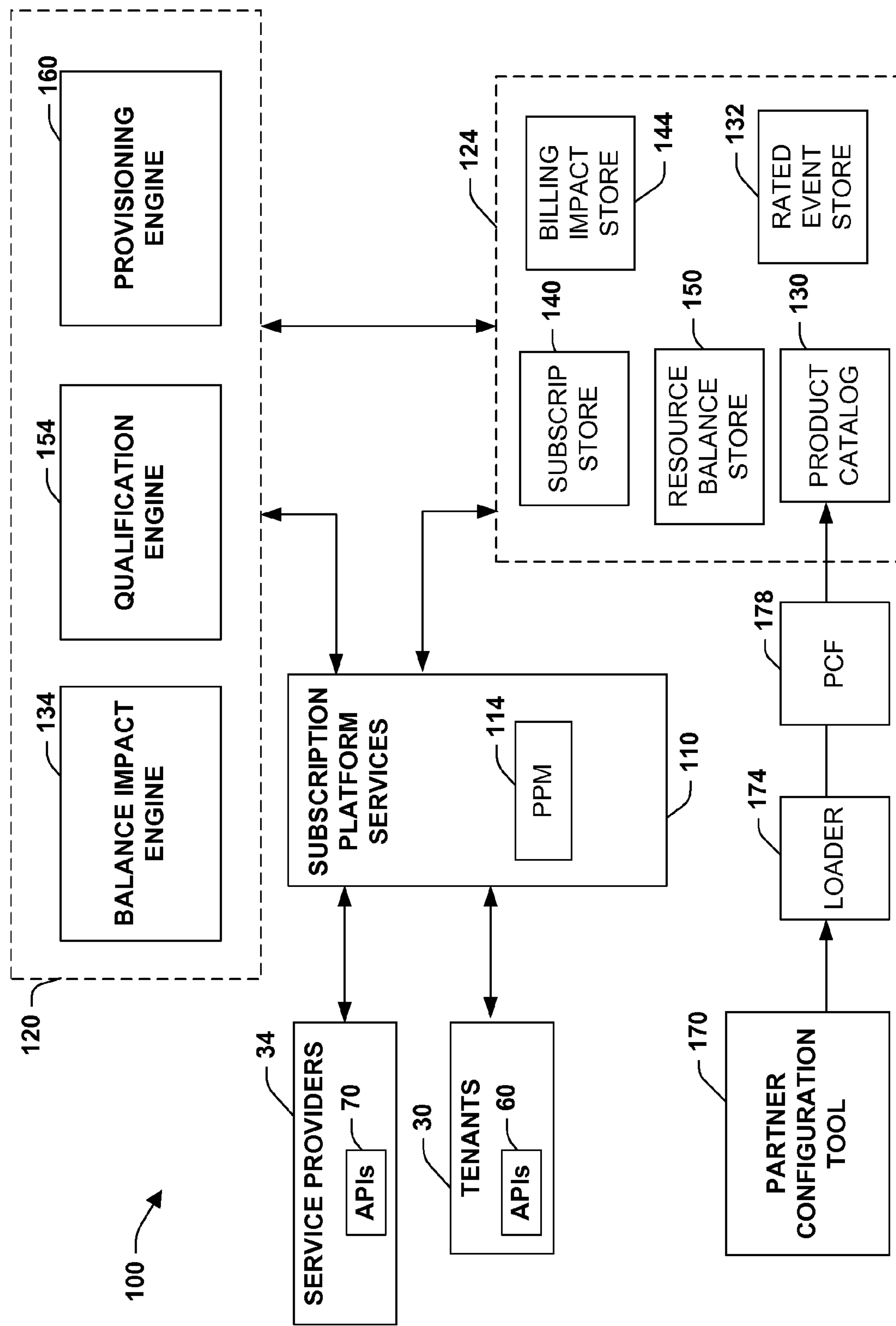
FIG. 2 is a schematic block diagram illustrating engine and data processing in accordance with an aspect of the present invention.

Referring now to FIG. 2, a system 100 illustrates an event processing architecture in accordance with the present invention. The system 100 can be organized into a multi-tier architecture that directs runtime communications with external parties through a Subscription Platform Services (SPS) layer 110. The SPS 110 includes a Partner Permissions Manager (PPM) 114 that facilitates enforcement of per partner permissions at tier associated with a partner communicating with the system 100. The PPM 114 is employed to enforce a partner permissions model (described below) on a per transaction basis enabling respective partners with suitable permissions to modify individual subscription and service states. The partner permissions model describes rights associated with a registered partner (e.g., tenants and/or service providers) that define their ability to modify individual subscription, account, and/or service states within the system 100.

The SPS 110 coordinates processing by various engines 120 within the system 100 and generally controls writing and updating data into various data stores 124. A product catalog 130 is provided that can include a defined SQL Server database that stores the catalog of service component definitions, partner permissions, and/or offering meta data. The product catalog 130 can also include rating, qualification, and/or service delivery rules associated with individual offerings. Additional features supported by the product catalog 130 include service component registrations (e.g., component ID assignments, partner IDs, URLs, support information), cross-partner offerings including multi-service component offerings and cross partner bundles. The catalog 130 can include globalized offerings according to a plurality of countries, languages, associated currencies, customs and taxes in addition to providing groups of offerings that map substantially any combination of services.

Offering information can also be stored in the product catalog 130. This information can include base, upgrade, downgrade, renewal, add-on, and mutual exclusivity between services information. In addition, eligibility information relating to date of sale, partners, languages, countries, currencies, maximum ownership per accounts, and valid payment instruments can be provided. Other offering information relates to billing cycles (e.g., monthly, multi-month, 28 day, forward/arrears cycle billing). This can also include information relating to renewals such as automatic or confirmed renewals and information relating to grace periods for settling accounts. Other catalog items can include event to rule mapping entries that define a subset of rules to be executed in the occurrence of an associated event.

A balance impact rating engine 134 processes an extensible set of rating rules and/or ratings events—from the product catalog 130 and a rated event store 132, respectively, in the context of a subscription and associated subscription events that can be stored in a subscription store 140. This engine 134 can process a plurality of balance impact events (e.g., events affecting payment and utilization of services) provided at the scale of multiple service providers, tenants, customers, and/or other entities. The balance impact events can be stored and processed in a billing impact store at 144. A resource balances store 150 maintains an aggregate amount for respective accounts that result from processing of rating rules by the balance impact rating engine 134. Balances can be "typed" to indicate a value for the units of service represented, and scoped to one or more service delivery rules. This can include processing currency and non-currency resources, and processing rating rules that respond to user driven events (UDE) such as purchase, cancellation, cycle, usage reports, convert to/from, renewal, suspend and reactivate, for example. In addition, ratable events can be partitioned according to periods and provide immediate settlements and/or settlement amounts aggregated per a selected payment instrument. It is noted that the engines 120 and/or system 100 components can be implemented in substantially any object model framework (e.g., COM, DCOM, CORBA, .NET).

A qualification engine 154 evaluates the eligibility of an individual user to purchase, cancel, and/or convert online service subscriptions. This engine 154 processes qualification rules (stored in the product catalog 130) associated with a given offering, employing attributes of an end user profile and associated subscriptions, for example. A provisioning engine 160 coordinates transactional processing of defined provisioning methods across common service providers in response to suitable events as provided in the subscription event model, described above. This engine 160 facilitates accurate and timely delivery of services to an end user. Provisioning methods include the act of setting the state (e.g., setting a flag or condition based on non-payment of bills) required to deliver or prevent delivery of a specified service to a designated user of the service or services. The provisioning engine 160 also controls the flow of communications to service providers 34, tenants 30, or other entity (not shown) that employ one or more APIs 60, 70 to respond to provisioning events.

A Partner Configuration Tool (PCT) 170 and a Partner Configuration Loader 174 can communicate to the product catalog 130 through an out-of-band process, if desired. Communications should be in accordance with an administrator having suitable security credentials for configuring and/or loading product catalog data. The PCT 170 can be implemented as a graphical user interface (GUI) tool to configure service delivery rules, offerings, qualification rules, and/or per tenant permissions in addition to other parameters. The Partner Configuration Loader 174 loads one or more Partner Configuration Files (PCF) 178 into multiple system environments facilitating shared development/testing—across partner's testing and deployment, into multiple production and pre-production environments. The Partner Configuration Loader 174 also facilitates creation of a partner account within the system 100 to provide a substantially secure transmission of protected data to a respective partner. A protecting key can be transmitted out of band, for example, in order to mitigate attempts at hacking the system 100. The PCF 178 can be a transient schema file that includes definitions of offerings and associated qualification, rating, service delivery rules and/or partner permissions in an XML format, if desired. This format can include design time attributes employed by the PCT 170 and/or runtime attributes employed by the various engines 120 in the system 100.

It is to be appreciated that the systems, components, and/or processes described thus far and described below can be implemented as individual components or processes and/or can be combined in various combinations. In addition, one or more of the described components and/or processes can be combined in accordance with various other components and/or processes—including providing all components and/or processes in a single component, or combinations of components, if desired.

FIGS. 3-10 illustrate components and/or methodologies to facilitate billing and provisioning processing in accordance with the present invention. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
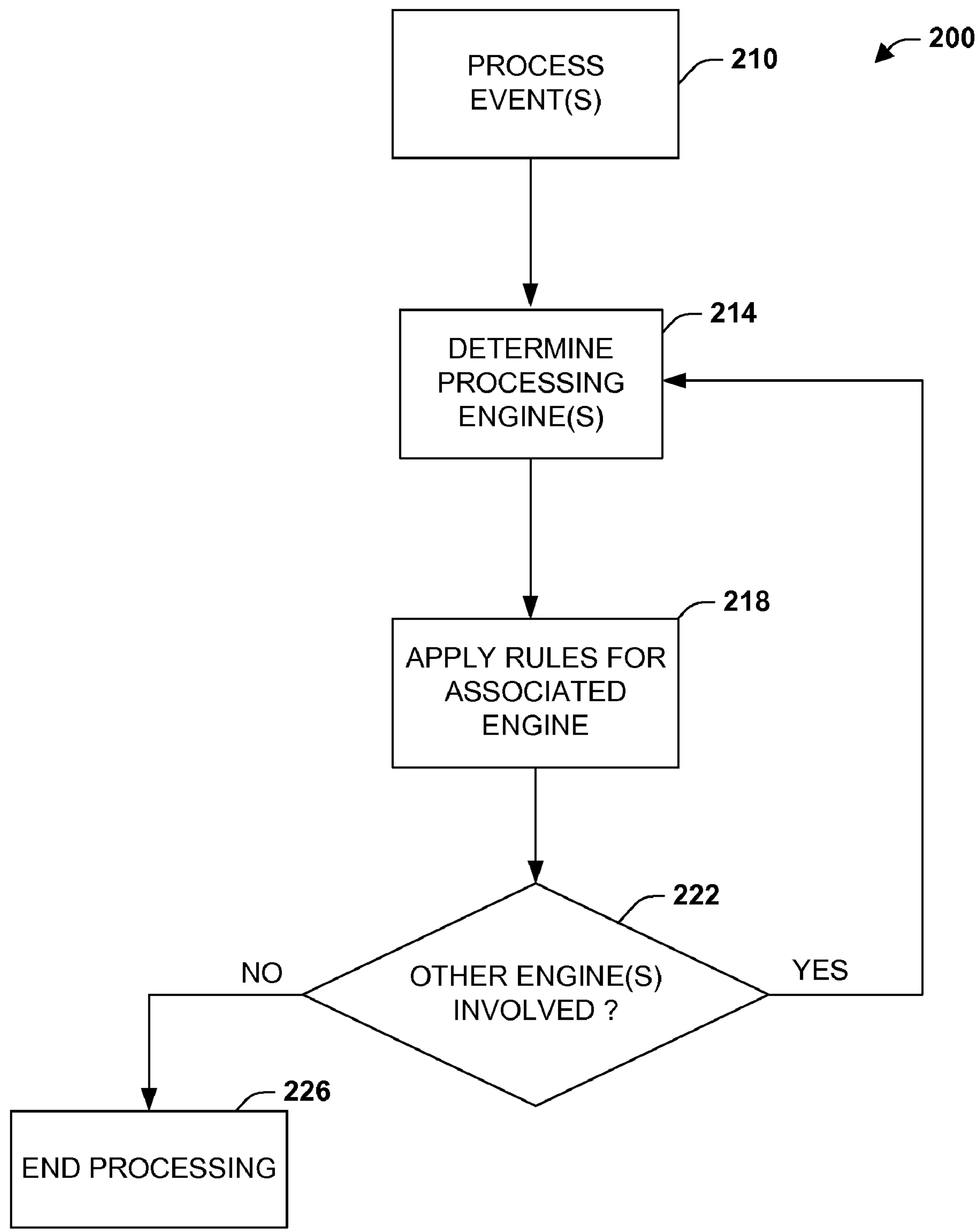
FIG. 3 is a flow diagram illustrating rules/event processing in accordance with an aspect of the present invention.

Referring to FIG. 3, a flow diagram 200 illustrates event and rule processing in accordance with an aspect of the present invention. At 210, one or more events are received and processed. This can include platform services events, usage events, cyclic events and/or other type events. At 214, a processing engine or engine is determined and selected based upon the event generated at 214. For example, if a qualification event is determined, a qualification engine can be selected. Similarly, if a ratings or provisioning event is determined, a ratings and/or provisioning engine can be selected and/or enabled. At 218, an associated set of rules can be invoked depending on the engine or engines selected at 218. For example, if a ratings event is detected at 210 and an associated ratings engine selected at 214, a set or subset of ratings rules can be processed by the associated ratings engine and/or in accordance with the type of event received at 210. At 222, a determination is made as to whether the processing initiated at 210, 214 and/or 218 involves invocation of subsequent engine processing. If no other engine processing is required, the process illustrated at 200 ends at 226. If subsequent and/or parallel processing is determined at 222, the process proceeds back to 214, wherein further engine processing is determined in accordance with applicable rules at 218.

Figure 4:
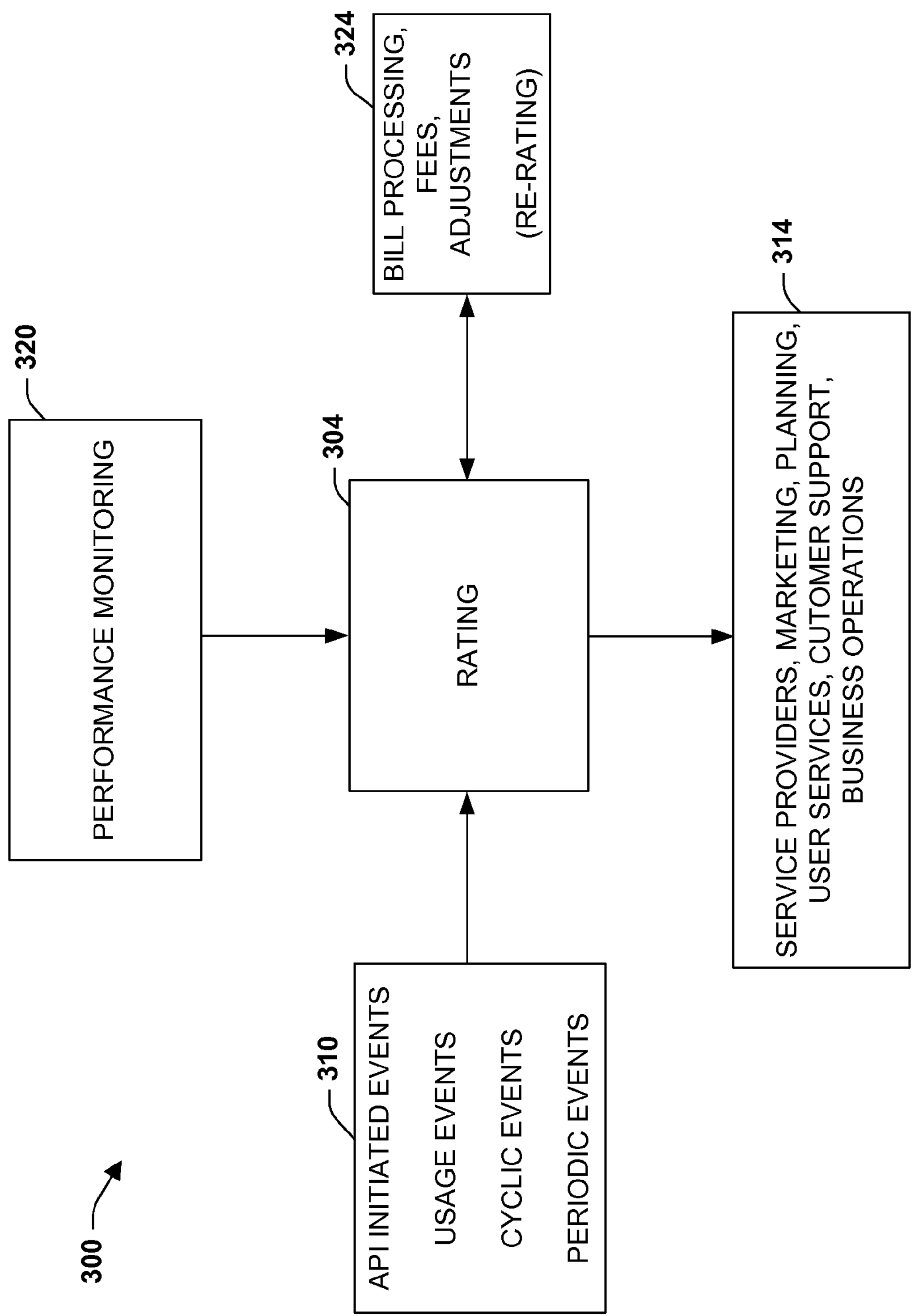
FIG. 4 is a diagram illustrating ratings systems processing in accordance with an aspect of the present invention.
Figure 5:
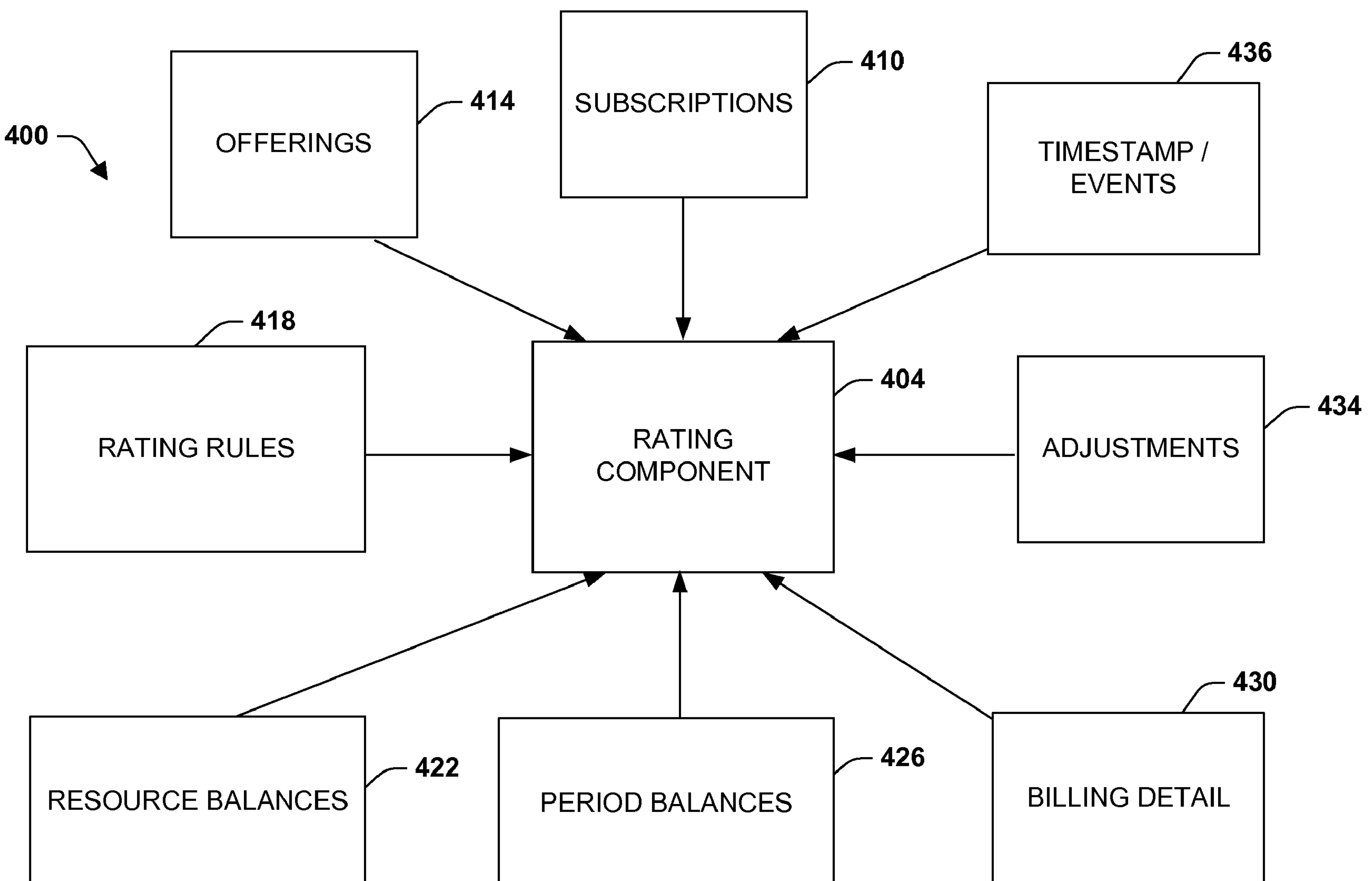
FIG. 5 is a diagram illustrating one or more inputs applied to a ratings architecture in accordance with an aspect of the present invention.
Figure 6:
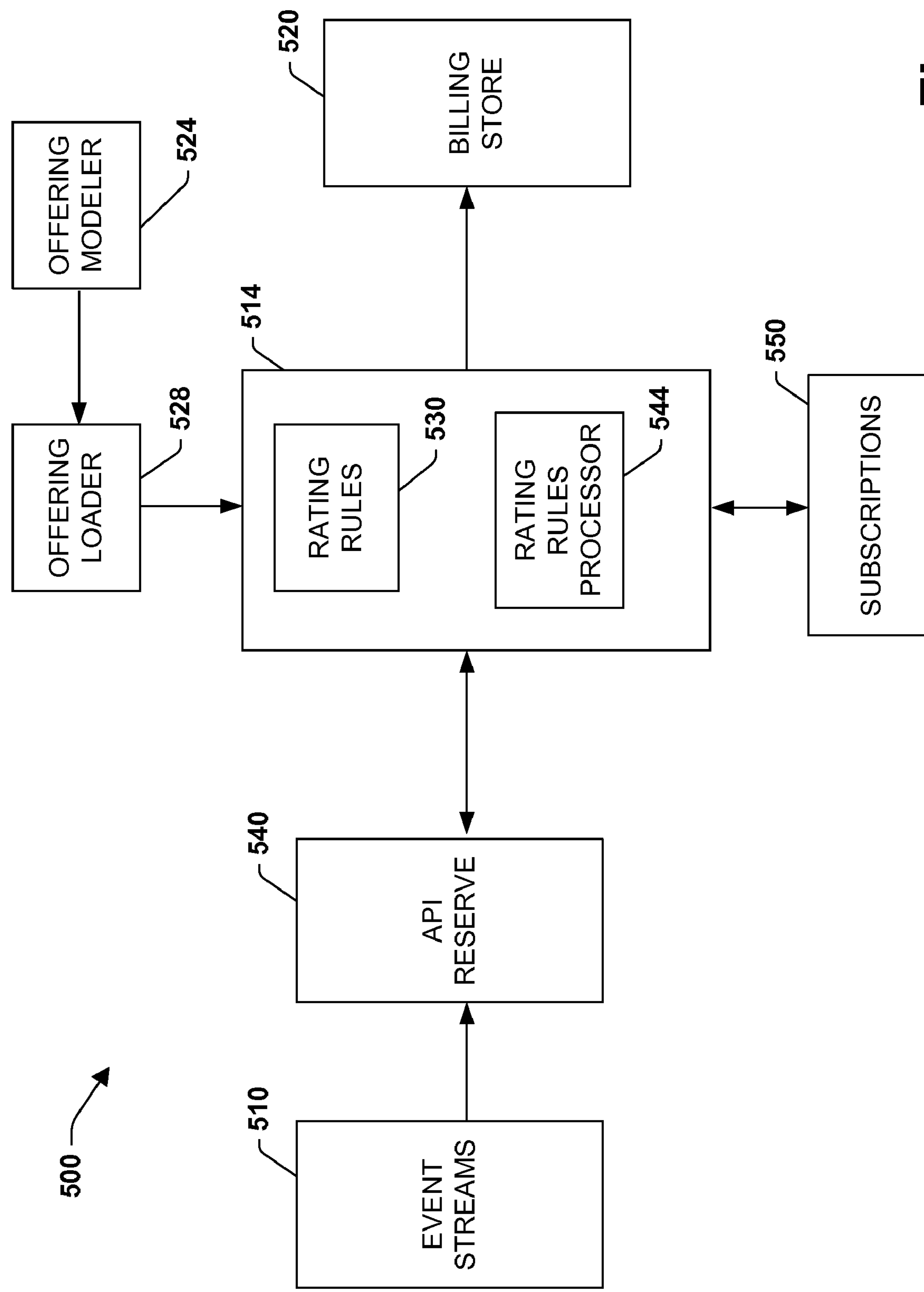
FIG. 6 is a diagram illustrating a ratings process and system in accordance with an aspect of the present invention.

FIGS. 4-6 illustrate a process of rating, processing events and/or interacting with services to be billed in a billing/provisioning system such as described above. The rating process can be utilized to determine a value of an event in currency or non-currency resources and associated impact on an account, subscription and/or resource balance before or after service consumption. Parameters and rules utilized in the rating process can be driven by offering details and persisted in a rating environment by an offering or partner configuration tool. The following table illustrates possible rating types and associated examples, although it is to be appreciated that other types and/or examples can be provided in accordance with the present invention.

| # | Basic Rating Types | Examples |
|---|---|---|
| 1. | Calculate Tax based on location & product code | If Washington 8.2% on Internet Services |
| 2. | Per unit—number used/consumed | 43 hours @ .60 |
| 3. | Proration | Cancel a 21.95 deal mid-cycle—Convert from $19.95 deal to 23.50 deal mid-cycle |
| 4. | One time Charge (on purchase only for 2.5) | $99.95 Modem |
| 5. | Cycle—(forward) | 21.95 @ month |
| 6. | Cancellation charge for term commits | 50% of remaining commitment or Sliding scale of flat fees |
| 7. | Allowances per cycle | 3 months free (1 per 3 cycles) 10 hours free per cycle |
| 8. | Suspend Subscription | Credit for service not used if forward bill |
| 9. | Enable Subscriptions | Charge for service used—forward |
| 10. | Purchase Fees | $100 setup fee |
| 11. | Convert from offer A to Offer B | Conversion charge Prorate mid cycle conversion |

FIG. 4 illustrates a rating process 300. A rating component 304 evaluates various billing system events 310 to determine balance impacts the events have on a customer account or subscription. The events 310 can include API initiated events from a partner, usage events based upon service consumption, cyclic and/or periodic events that occur over time. As illustrated at 314, the rating component 304 can expose various methods/data that can be employed by service providers, marketing and planning, user services, customer support, and business operations for information, auditing and control. The ratings component 304 can also support performance monitoring operations at 320 that relate to determining various business, quality, and/or financial aspects of a service or an account. At 324, the rating component 304 interacts with bill processing components, fees assessments, account adjustments and can drive a re-rating process when subsequent events occur over time.

FIG. 5 illustrates one or more components of a ratings architecture 400. These components include a ratings component 404 interacting with subscriptions 410, offerings 414, rating rules 418, resource balances 422 (e.g., billing invoice), period balances 426, billing detail 430, adjustments 434, and timestamp or other operational information 436. Offerings 414 (e.g., deals per tenant) can be modeled via the Partner Configuration Tool described above and persisted in a subscription database. Services, service components as well as offering events or user driven events (UDEs) can be identified and utilized to further describe an offer and an activity that can generate tracking or billing impacts. The rating rules 418 can be configured for respective User Driven Event (UDE) that can be received for a selected offer and loaded into a Rating Rules data store. When a UDE is generated for a subscription 410, for example, the rating component 404 processes the associated rules for the event type.

Subscriptions 410 apply to an offer within the context of a billable account, wherein associated subscription data describes one or more terms that may apply to the offer for the account such as start, end, status, and payment instrument employed, for example. Adjustments 434 are rating rules applied to a specified subscription for a selected billing period. This can include entering an adjustment amount for a period specified in an adjustment plan table for a selected account. At 436, operational information such as a timestamp or other type event can be considered by the ratings component 404. At 430, billing detail includes determining balance impacts that can be updated in a billing detail table or tables. This can include providing supporting documentation for an online statement, tax, financial and/or management reporting.

At 422, resource balances can be provided as counters, for example, employed to track typed units consumed by and/or available to a subscriber. The counters can maintain balances and display detail of transfer or aggregation impacts that describe how many are left and why. Resources can be created as required by an offer in a modeling or configuration tool, and resource balances can be instantiated as needed by the rating rules 418 in accordance with the rating process. Resource types describe the type of resource via a combination of units of measure and product type. Units of measure can be differentiated by currency and non-currency in rating. A further breakdown into time or size elements can be provided to confirm that usage events are reported in the same or convertible units of measure required to aggregate in a resource balance. The following tables illustrate possible examples of units of measure, products, and resource types, wherein it is to be appreciated that other such examples can be provided in accordance with the present invention.

Examples: Units of Measure

| Units of Measure | Description |
|---|---|
| Number_Units | The basic resource type |
| Time Hours | Used for tracking balance impacts in hours |
| Time Minutes | Used for tracking balance impacts in minutes |
| Size MB | Used for tracking balance impacts in MB |
| Size_KB | Used for tracking balance impacts in KB |
| Size Bytes | Used for tracking balance impacts in MB |
| Currency | Used for tracking balance impacts in Currency |
| Size_GB | Used for tracking balance impacts in GB |

Examples: Products

| Product/Service | Description |
|---|---|
| Play Games | Online playing of Games |
| Download Games | Downloading Games |
| Play Music | Online Playing of Music |
| Download Music | Downloading Music |
| BB Access | Broadband (DSL) Access |
| NB Access | Dial up Internet Access |
| Outbound Faxes | Sending Faxes |
| Email Storage | Mailbox size |

Examples: Possible Resource Types

| | -- Resource Type -- | | Resource | |
|---|---|---|---|---|
| Resource Instance | Units of Measure | Product (mapped to tax code) | Friendly Name | Scope |
| Subs USD | Currency | Online Access | DSL with limited NB | Subscription |
| Min NB Access | Minutes | Online Access | Daytime Dial up Access | Service Instance |
| Hrs NB Access | Hours | Online Access | Daytime Dial up Access | Subscription |
| Hrs Access | Hours | Online Access | All Time Dial up Access | Subscription |
| Number Faxes | Units | Faxes | Pages via Fax | Service Instance |
| Number Points | Units | Points | Microsoft Points earned | Subscription |
| MB of Messages | Size MB | Message | Size of Messages Sent | Subscription |
| MB Email Storage | Size MB | Email Storage | Email storage | Subscription |

It is noted that the scope value listed in resource types indicates the primary object the resource is associated with. It can be employed with APIs and Rating for assessing balance impacts. Some possible values are: Account Level, Subscription, and Service Instance. In addition to the resource balances 422, period balances 426 (e.g., settlement amounts) can be utilized to aggregate charges and credits for a billing transaction (e.g., item sent for settlement) within a period by currency and payment instrument.

Referring to FIG. 6, a rating process and system diagram 500 illustrates rating components and a process for rating an event. The rating process 500 receives API generated events, periodic events, cycle events, and/or usage events (e.g., service consumption) that are defined by different User Driven Event (UDE), types (e.g., purchase, cancel, convert, suspend, reactivate, renew, write-off). The events can be generated at 510 in the form of an event or event stream. An action processor 514 associates rating rules defined for the event with the actions required to implement the rules, perform any preliminary processing and determine a target or queue to receive the action. Balance impact items can be passed to a Resource Balance Impact Details Store (not shown) provided in a billing store 520, wherein any late conditional logic based on the data stored in the billing store can be performed. Rated items with balance impacts update a resource balance and are written to the billing store 520 linked by a billing impact record. This information can be made available for later retrieval by business operations, customer support or the end customer by an interactive self-service tool (not shown). The system 500 can also include an offering modeler tool 524 (e.g., Partner Configuration Tool) to enable users to describe rating rules to process a User Driven Event (UDE) for a given offer. An offering loader 528 persists the rating rules into a rating rules store at 530.

The event streams 510 can be generated from APIs such as customer initiated events, customer service events, and or business operations, for example. Usage events can be submitted in a standard format defined in the SPS described above and processed as an impact to the correct resource balance. Cycle process events can rate and apply subsequent dollars (e.g., Marks, Francs, and so forth) to a suitable period settlement amount. Cycle Events can include a cycle end process to generate time-based events that assess periodic charges, allowances, and/or rate resource usage, for example. One or more UDEs can be submitted by an external (user) or internal (system) generated operation. Some UDEs can have a variable balance impact that will be managed by a set of rating rules. User driven events generally are evaluated by the ratings process—whether or not they generate a charge or have a balance impact. The following describes some possible UDEs that can be provided in accordance with the present invention.

Purchase: Employed to purchase an offering, create a new subscription, set up charges according to rating rules for the offering. If the customer already has an account with a cycle already established, may prorate from date of purchase to next cycle day and trigger cycle event to bill without delay.

Cancel: Employed to cancel a subscription. May prorate credit for unused service and/or issue cancellation charges based on rating rules.

Cycle: A cycle UDE can drive period end assessments (e.g., subscription charges), rate and apply resource balances to other resource balances or settlement amounts, and reset resource allowances as well as carry forward open balances.

Convert From: Employed to migrate or convert from one subscription to another. Common services between the offers can be maintained. There may be conversion fees, prorated charges and/or credits associated with the subscription the customer is converting from. Resource balances should be converted to currency and written to a settlement account as a new plan may require new balances.

Suspend: Employed to suspend a subscription. May have charges associated with the action. May be configured to give credit for unused service Re-enable: (i.e., un-suspend, re-activate) may be configured to credit suspension charges. May prorate charge for available service or initial resource with new allowance.

Convert To: (similar to convert from above) There may be conversion fees, prorated charges and/or credits associated with the subscription the customer is moving to.

Renew: Extends the end date of a subscription by the typical offering period. May be employed to renew into a new offer during cycle/periodic processing, may or may not have charges and/or credits configured.

An API Reserve component 540 includes rating logic that can be provided in the APIs used to process different events. Instantiation of rating logic enables a predetermined amount of pre-processing to occur before the event is submitted to a rating engine or rating rules processor 544. The rating rules 530 which are processed by the rules processor 544 can be applied to a plurality of online subscriptions 550. The rules can be configured by selecting values for a given set of parameters for respective rule types. The values may be predetermined in the case of some system generated event rules, restricted to a list of values, and/or entered by the user configuring the offering. The following describes one or more possible exemplary rule types.

A Charge Rule can apply a static adjustment (specified by a rate parameter) to a single resource balance (e.g., specified by a Resource1 parameter). Generally employed for purchase charges, monthly charges, cancel charges, and so forth.

An InitResource Rule resets a resource balance (e.g., specified by Resource1) to a value specified in a Rate parameter). Typically used for monthly free resources (e.g., 40 hours per month free). Resource1 type parameters generally do not have a currency type. Absence of the InitResource rule in a Cycle UDE can imply a default intention to "carry forward" associated resource balances to the next billing cycle.

A ConvertResource rule employs the resource balance indicated by the Resource1 parameter, multiplies this value by the Rate parameter, and adds the result to the balance of the Resource indicated by a Resource2 parameter or variable. Resource1 generally must be of non-currency type, whereas Resource2 may be of currency or non-currency type.

A Prorate rule can be used to prorate charges and credits based on portion of the cycle used or not used on the prorate rule of a cancel or suspend UDE. This can relate to a Cycle Forward offer, wherein a positive number in the PCF, described above, results as a credit (or negative number) on the customer's account. A negative number in the PCF can be a charge (or positive number) on the customer's account, for example. The following tables illustrate some exemplary UDE to rating rule mappings and rating rule variables.

UDE to Rating Rule Mapping

Any number of rules can be configured for a UDE, however, rating rules are optional—if there are no charges for an event no rules typically need be configured.

| UDE | Rating Rule | Examples |
|---|---|---|
| Purchase | Charge | Connection fee, Shipping & handling charge, Subscription charge for yearly subsription |
| | Prorate | Purchase on the 30$^{th}$ anniversary => 28$^{th}$ prorate the cycle charge from 30th to the 27$^{th}$ |
| | Init Resource | Give 1000 minutes of IA usage free on purchase |
| Cancel | Charge | A flat cancellation charge |
| | Convert Resource | Convert accumulated usage to currency charge |
| | Prorate | Prorate the cycle charge for amount to credit if canceled mid cycle |
| | | Prorate a term commit cancel charge based on the number of periods subscription was active |
| Cycle | Charge | Charge per cycle |
| | Init Resource | Give 1000 free minutes of IA usage free |
| | Convert Resource | Convert accumulated usage to currency charge for the cycle |
| Suspend | Charge | A late charge or suspend fee |
| | Convert Resource | Convert accumulated usage to currency charge |
| | Prorate | Prorate the cycle charge for amount to credit if suspended mid cycle |
| Re-enable | Charge | A reconnection fee |
| | Prorate | Prorate the cycle amount to charge from the day re-enabled to the next billing date |
| | Init Resource | Give 1000 minutes of IA usage free on Re-enable |
| Convert To | Charge | Conversion charge |
| | Init Resource | Give 1000 minutes of IA usage free on covert |
| | Prorate | Prorate the cycle charge from the day converted if 29, 30, 31 to the next billing day 28th |
| Convert From | Charge | Conversion Charge |
| | Convert Resource | Convert accumulated usage to currency charge |
| | Prorate | Prorate the cycle charge for amount to credit if converted from in mid cycle |
| Renew Into | Charge | A renewal charge |
| | Prorate | Prorate the cycle charge from the day converted if 29, 30, 31 to the next billing day 28th |
| | Init Resource | |

Rating Rule Variables

| Rating Params | Description | Charge | Init Resource | Convert Resource | Prorate |
|---|---|---|---|---|---|
| 1. Rate | Rate/charge | X | X | X | X |
| 2. Units | Unit per charge | X | X | X | X |
| Resource1 | Input Resource | X | X | X | X |

-continued

| Rating Rule Variables | | | | | |
|---|---|---|---|---|---|
| Rating Params | Description | Charge | Init Resource | Convert Resource | Prorate |
| Resource2 | Target Resource | | | X | |
| Ignore Credit | Used in aggregating billing, if cycle credit not used | | | X | |
| Cycle Unit | # cycles per charge (3 = quarterly, 12-yearly) | X | X | x | x |
| Rule Start | Start day or cycle relative to deal or subscription start. | X | X | X | X |
| Rule End | End day or cycle relative to deal or subscription start | X | X | X | X |
| Immediate Settlement | Submit for next billing run (new resource balance) | X | | X | X |
| Prorate % | % of Rate to apply | | | | X |
| Revenue SKU | For Revenue reporting | X | | X | X |
| Subs Cycle | Use Subscription Cycle Flag * (if not set use Deal Cycle to determine charge) | X | X | X | X |

The rating rules processor 544 includes logic for receiving an event (e.g., UDE), and selecting the rating rules configured for an offer that apply to that event for a date specified. In the case of a Cycle UDE it also retrieves subscription adjustments from the subscription component 550 that are due for rating. The rules are evaluated or rated and the resulting charges returned to the caller.

The Billing Store 529 includes resource balances, settlement amounts, and supporting detail. Balances or counters can be established for the respective resource identified in a deal or offer. During cycle processing these balances can be rated and applied to settlement amounts. An example offer can be structured as follows:

Example: Office Gold Plan

Purchase Fee—$199.95

Cycle Fee—$29.95

Usage Word—$2 per hour

Usage Print—$1 each

Cycle Print—Allowance 10 per cycle

Resources can be tracked for Currency, Hours of Word usage and Printed documents, for example. During a purchase event, balances or counters for associated resources can be created, wherein an event can be fired to create an initial print document allowance of 10, for example. The event can update the resource balance and post to a detail table(s) supporting documentation. As a word application is used and documents are printed, usage can be accumulated in the associated counter. In addition to resource balances, there can be period settlement amounts (balances) to accumulate billable amounts on a cycle anniversary for the account. This can include processing the cycle event and adding the fees for usage and the printed documents for billing to the settlement amount. A new set of counters can be employed for the following cycle and those allowances rolling forward can be credited to the charges. In this case, the balance can be set to zero and a new allowance for a predetermined number of documents posted.

Figure 7:
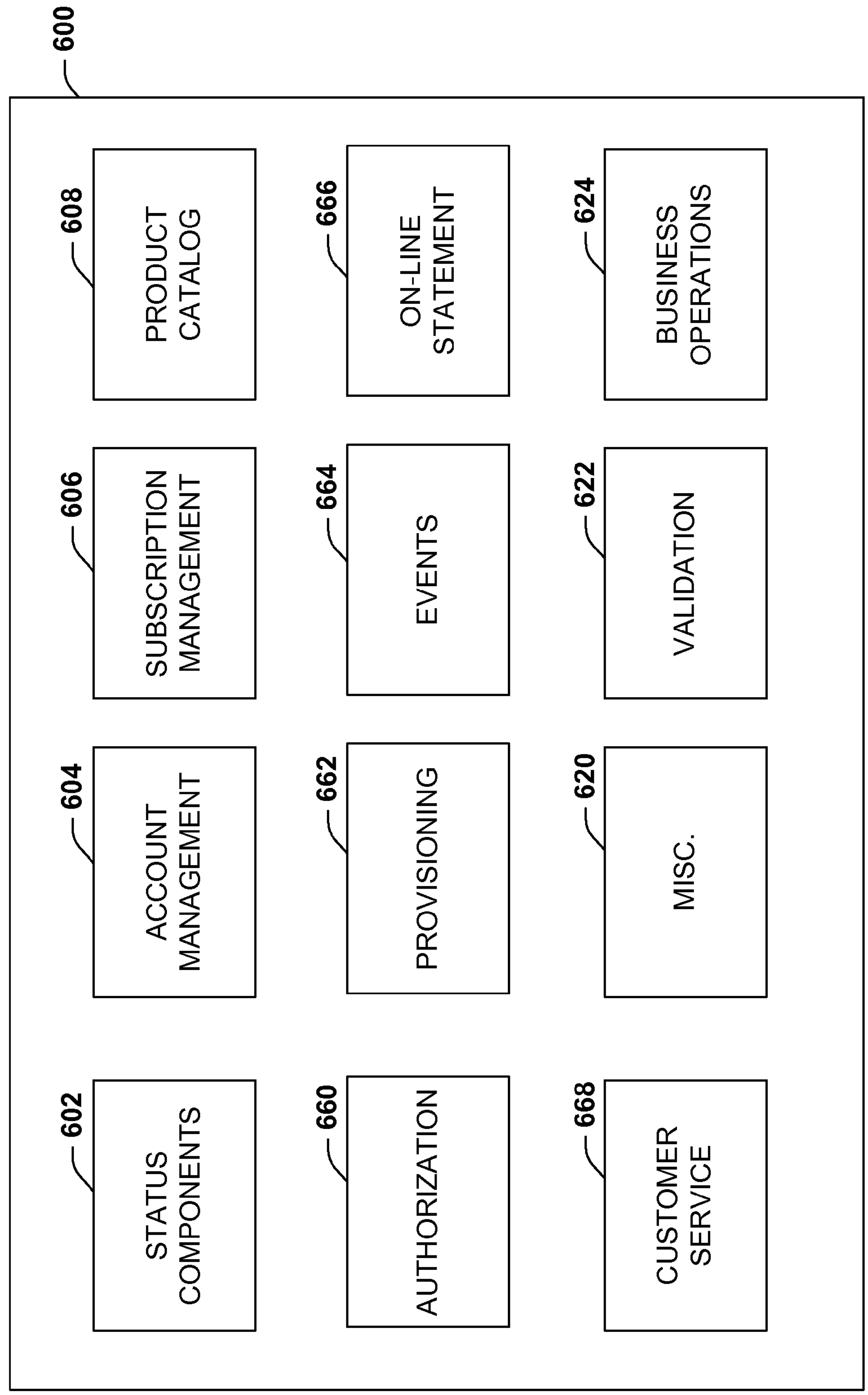
FIG. 7 is a diagram illustrating framework components in accordance with an aspect of the present invention.

Referring now to FIG. 7, one or more components of a subscription platform service 600 are illustrated in accordance with an aspect of the present invention. At 602, status components are provided to determine whether accounts are enabled, expired, suspended, or cancelled. At 604, an account management component includes functionality for creating a customer's account. At 606, a subscription management component can provide purchase offerings, subscription conversion utilities, subscription information and/or subscription status. At 608, product catalog components can provide product base offering information and facilitate determining the components of a service. At 610, an authorization component can perform such activities as retrieving and operating upon permits relating to account access.

At 612, a provisioning component can be provided for provisioning and deprovisioning services that can include updating and/or monitoring provisioning data. At 614, events are monitored such as how much activity or services a customer has utilized in order to determine a billing amount. At 616, on-line statements can be generated such as providing billing statements and providing information relating to account activity. At 618, a customer service component can be provided to issue account credits, provide comments, and/or settle/pay disputed accounts, for example. At 620, miscellaneous functions can be provided such for encryption, testing and/or data manipulation. At 622, a validation component can include formats for postal code validation, state validation for the U.S., and/or province validation for countries such as Canada, for example. At 624, a business operations component can provide accounting procedures such as writing off an account and/or accepting or rejecting a disputed item associated with an account, for example.

The above components 602-624 can interact within a dynamic environment provided by the platform services 600 and or other components described above. The following describes some of the dynamic aspects including aspects relating to interacting and/or interfacing to the components 602-624. These aspects include how associated parameters are passed and/or processed, how errors are generally handled, how status is determined or affected by the system, component interactions, and/or events such as customer/provider activities (e.g., payment/nonpayment, inactive/active status).

Regarding parameters, one or more of the following conventions can be employed. If a parameter is not needed, for example, it generally is set to 0 (or another value). There is typically no partial success when performing a call. For example, if an account validation fails on part of an input, the entire call can fail. Generally, operation calls do not return a success value. It is noted that implementation details are typically hidden, wherein system users should not be aware that platform services represent a particular number in a database, for example. Generally, spaces at the beginning and end of data values passed in XML or other format can be stripped, and maximum lengths specified are in characters, typically regardless of size of the character (e.g., single or double byte). XML fields are generally considered text unless otherwise specified. Where needed, partner or entity identification can be derived from a partner authentication process. Personal User Identifiers (PUIDs) can be passed to the billing system and returned from the billing system. Dates are in ISO 8601 Format (or other format): YYYY-MM-DDTHH:MM:SS (T is a constant, for example: 2002-11-30T12:15:30), wherein Time and "T" are generally omitted if unnecessary. XML top level nodes (those passed in as formal parameters) typically have a billing namespace referenced (e.g., xmlns="urn:schemas-company-com:billing-data").

When a parameter is marked as optional, an associated value generally does not need to be specified. If the value is not specified, it can be specified as a value listed below, for example.

Long/Int 0 (Zero)

BSTR An Empty String " "

When an XML node is marked as Optional, this indicates that the node itself may be omitted from the XML. Passing an empty node such as <Foo/> or <Foo></Foo>, for example, can be assumed to be a setting of a null string. Some APIs have nodes which are passed regardless of situation, but may be empty. If the node is marked as required, then it can be present in the XML. If the node is associated with a minimum length of 0, for example, then it may be empty, otherwise (e.g., min length >0) it contains data. If the node is marked as optional, then it typically does not need to be present in the XML. If it is present, then the minimum length applies. This indicates that an optional node with a minimum length of 1 cannot be included empty, but can be left out, if desired, which indicates the value cannot be set to the empty string, but does not have to be included.

In addition to parameter considerations, error handling can be provided in accordance with the present invention. Generally, APIs return a Result XML structure. Within the result structure, there can be an associated ErrorInfo node. This node encapsulates error information for the respective API call and a possible structure is illustrated below.

| | Node | Description |
|---|---|---|
| 1. | <Result> | |
| 2. | <ErrorInfo> | An XML structure detailing the success or specific error of the API call. This structure is detailed in the error handling section below. |
| 3. | <ErrorHResult/> | The error code. |
| 4. | <ErrorMessage/> | A message describing the error. This is intended for the developer's use. This error message should be returned as CDATA with "]]" removed or replaced. |
| 5. | <ErrorDebugInfo> | |
| 6. | <DebugInfo/><br><DebugInfo/> | Debug information to help developer debug problems. |
| 7. | </ErrorDebugInfo> | |
| 8. | </ErrorInfo> | |
| 9. | </Result> | |

Typically, APIs which perform changes to the billing system that would cause duplicate effects if executed twice have a bstrTrackingGUID (Globally Unique Identifier) parameter. If a connection failed and the status of the transaction is unknown, the transaction should be sent again with the same GUID and the same parameters. If the connection dropped before the transaction was submitted to the billing system, the transaction can be performed as originally submitted. If the connection dropped after the transaction arrived at the billing system, in order that the transaction completed but the results are unknown, then retrying employing the same GUID and parameters can return the results of the completed transaction. API calls that perform unrepeatable changes within the billing system enable this parameter to be passed. The tracking GUID is generated by the tenant and should be unique. The nature of GUIDs facilitates that a GUID from one tenant will not clash with another tenant, but that the tenant is responsible for determining that they pass GUIDs which are unique within their own systems. A new GUID should be sent when a new transaction is performed. The results of the transaction can be stored in the system for one hour or other predetermined time. If a duplicate GUID is passed into the system with different parameters or into a different API call, an error can result.

If the transaction arrives at the billing system and is retried with the same GUID too soon, the transaction may not have been completed in the billing system. In this case a transaction pending result can be returned. The application can wait a small amount of time and attempt to determine the results again, if desired. It is typically recommended that there be a timeout in an associated user interface for user steps in between calls to the billing system with the same GUID. It is possible that a user may wait long enough that the billing system has flushed the record of the GUID and as a result, the transaction is performed twice. For example, if the user selects submit, this can result in a call to the billing system, if they select submit again, it is sent with the same GUID to mitigate duplicate transactions. If a connection drops and the call returns pending, the following message can be returned to the user: "Please try again." The user may wait an hour or other time before retrying. If the system then submits the transaction with the same GUID and the original transaction actually succeeded, a duplicate transaction can be in the system. This can cause an entity to purchase more than one item when they desired one. It is thus recommended that user interactions be provided with a predetermined timeout.

Several APIs, such as purchase offering, convert subscription and cancel subscription, for example, support a verify flag. Passing in a 1, for example, in an fComputeOnly parameter enables the tenant to perform an operation that calculates the associated pricing information—generally without committing any changes to the database. This should be employed in the case whereby the customer needs to be informed of what they can be charged before committing to a billing operation. A purchase offering calc-only call can also check that maximum ownership will not be exceeded by making the call.

Most APIs receive at least two parameters at the beginning, a Delegate and Requester. These parameters determine who is performing the action specified. The requester can be the customer making the request. In most cases, this should be an administrator on the account referenced. If no customer is making the request, this parameter should be set to 0,0, for example. Some APIs do not enable being called without a customer making the request. In another aspect, the delegate is the person or entity performing requests on behalf of the customer. In most cases, this should be the PUID of a customer service representative. If there is no such person or entity that is performing the action on behalf of the requester, this should be set to zero.

The Delegate is employed to track the person or entity performing an action, thus, tenants and tools can be tracked via other methods. If the Delegate is set to 0,0, it can be assumed that the tenant or tool is performing the action on behalf of the customer. Generally, no authorization is performed upon the delegate PUID, whereby authorization is performed by a customer service representative component or tool. The Delegate PUID generally should be unique to the person performing the action, however, as it is logged with the actions they perform within the system. If a delegate is specified, associated comments made to the account can be marked as being commented by that delegate.

An account or subscription can have an associated list of violations. A violation defines an action that the customer should remedy in order to be able to have their account activated or their subscription considered enabled. Violations can be independent of each other (i.e., because the customer remedied one violation doesn't indicate they remedied another). Thus, accounts and subscriptions can tabulate a list of violations outstanding and before the account can be activated or the subscription can be enabled, respective violations are cleared. Generally, when all violations have been removed, the account can be activated or the subscription can be enabled. A list of outstanding violations is generally returned with the account or subscription status. As an example, a customer has started spamming on an e-mail subscription service account. The tenant suspends the subscription the customer purchased the account with, thus stopping his access to his account, for the tenant's e-mail subscription service violation. Meanwhile, the customer's credit card has been declining and has reached a predetermined number of declines. The billing system then suspends the subscription for the billing declines violation. Thus, the subscription is suspended for two violations. Before the customer can begin to utilize e-mail in the future, the e-mail subscription service should enable the subscription for the e-mail subscription service tenant-specific violation. This will leave the subscription with one violation, still suspended. Then the customer should pay their credit card bill, causing the billing system to be able to collect the outstanding balance and causing the billing system to enable the subscription for the billing declines violation. After violations are removed, the subscription can be tagged with an Enabled status and the customer can resume using e-mail, for example.

Violations can exist on an account or subscription regardless of its present state. If a subscription moves to the expired state, it can retain associated violations and if it were to be renewed, the violations would still remain. An exception to this is that there are generally no violations on an Active account or an Enabled subscription. Thus, an account or subscription cannot typically have on it more than one of the violations, which are presently in existence in the system. For example, if only three violations are defined by the system, then a single account can have three violations.

Another type violation can include a billing decline violation. This type of violation is employed when a customer has reached a predetermined limit defined by the billing system's business policy on the number of declines allowed before service is suspended. Still another type violation includes a billing terms of service violation. This violation type is utilized when a customer violates billing terms of a service, to which they were required to agree when they created an account. Yet another violation can include partner specific violations. Billing partners (e.g., tenants, service providers, payment providers) can have a violation defined specifically for the respective entity. Generally, one violation can be enabled per partner, but other violations can be permitted. Partner violations are generally independent of each other. If one partner suspends a subscription for an associated violation, generally, only that partner can enable the subscription for the violation and the subscription typically will not be enabled until all violations are removed—thus, enabling partners to lodge violations separately and not to override or interfere with each other.

Figure 8:
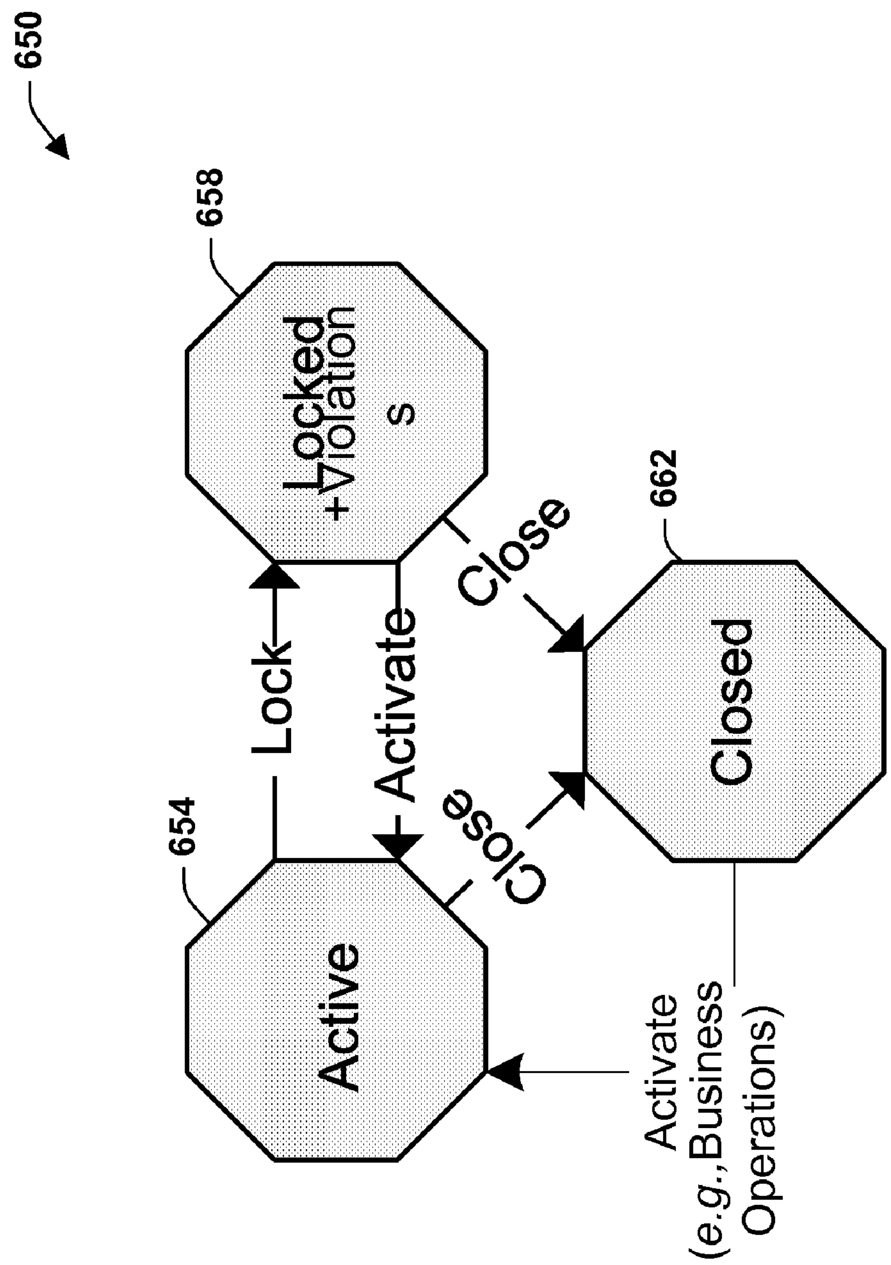
FIG. 8 is a diagram illustrating account status and transition in accordance with an aspect of the present invention.

Referring now to FIG. 8, an exemplary account status and state transition diagram 650 is illustrated in accordance with the present invention. Such statuses and transitions can include an active status 654, a locked status 658, and a closed status 662. Regarding active status 654, an account generally receives this status if it does not have any account level restrictions or violations. Regarding the locked status 658, the account has been locked to prevent further purchases. Locking an account does not prevent currently owned subscriptions from being accessed or billed. Locked accounts may still have balances and may perform modifications to associated account information, payment instruments and/or other account information.

The locked account status 658 can be associated with a list of violations. As described above, when all violations have been removed (e.g., by calling Remove Violation function for the respective violation) the account can return to the active status at 654. Regarding the closed status at 662, an account is generally not being accessed in any capacity. New Purchases are not allowed and account and payment instrument information cannot be changed. If an account is closed, subscriptions associated with that account are generally cancelled. Closed accounts may have balances, however. When the account is closed, a user is not authorized to access it, whereas a closed account may or may not have violations associated with it. If a closed account with violations were to be reactivated by business operations for example, the violations would still exist and the account can be tagged as locked at 658.

Figure 9:
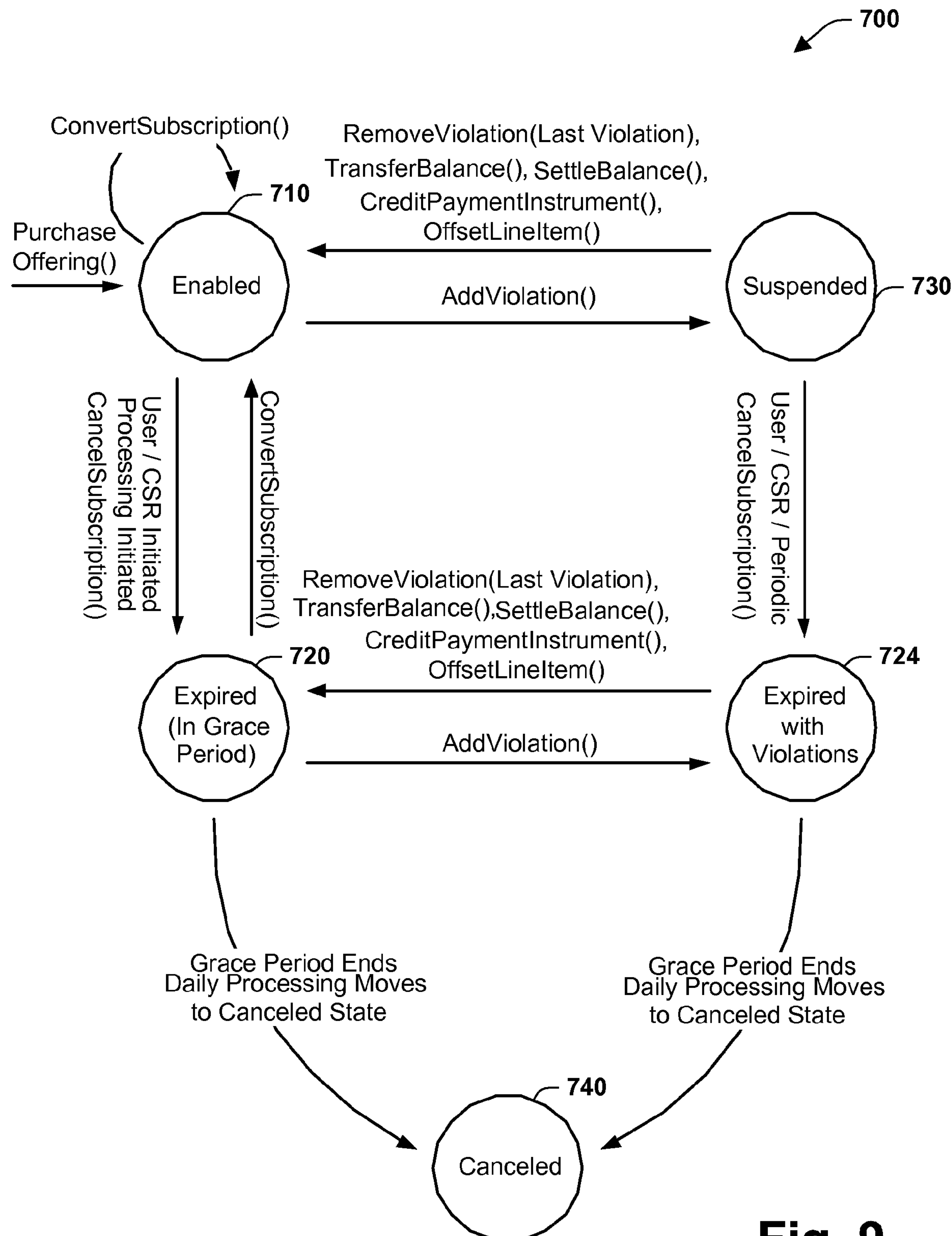
FIG. 9 is a diagram illustrating subscription status and transition in accordance with an aspect of the present invention.

Turning to FIG. 9, a state diagram 700 illustrates account status transitions in accordance with the present invention. The diagram 700 also illustrates one or more exemplary functions for transitioning from one state to another (e.g., Remove Violation, Transfer Balance, Settle Balance, Credit Payment Instrument, Offset Line Item, Add Violation, Convert Subscription, and Cancel Subscription). At 710, an enabled subscription state is illustrated, wherein an associated subscription is in good standing (i.e., no violations or other negative flags). At 720 and 724, the subscription has moved past its predetermined subscription end date and is now in a renewal grace period. The renewal grace period is the period of time that enables the user to renew a subscription utilizing the renewal provided for or associated with the subscription (and therefore possibly a reduced price).

An authorization permit can be provided that reflects that the subscription is in the expired status, whereby the service provider determines how this status affects the customer's access to the service. The subscription can have an expired status at 720 or 724 until the customer renews the subscription and/or the end of the renewal grace period is reached and the system cancels the subscription. The grace period may be a small amount or zero, if desired, thus the account may not enter the expired state or remain there for a short amount of time. It is expected, but not enforced, that the service provider will not do any irreversible deprovisioning while the subscription has this status, as the subscription may be renewed by the customer and the services reinstated. An expired subscription may have an associated list of violations at 724. If the subscription is renewed, the violations will remain and the renewed subscription can be in a suspended state at 730.

The subscription can be suspended at 730 to prevent utilization of the services defined by the subscription, therefore, the customer is generally not charged for the service during the time the subscription is suspended, wherein existing charges can still be collected. It is noted that suspending a subscription does not prevent purchasing. The subscription can also be suspended at 730 for a list of violations, whereby not until the list has been cleared will the subscription transition back to enabled at 710. It is also expected, but not enforced, that the service provider will not do any irreversible deprovisioning while the subscription has this status—as the violations can be remedied by the customer, and the services reinstated.

At 740, a cancelled subscription status can be provided. Thus, subscriptions and the services defined by the subscription are no longer being employed in any capacity. New charges are also not generated. In order to move an account to the cancelled or closed status at 740, the subscriptions under that account are cancelled. A cancelled subscription may have an associated list of violations and may or may not have a list of violations associated with it. A canceled subscription generally cannot be re-enabled.

In accordance with the status described above, a subscription length can be determined by the offer purchased. The actual length of the subscription, however, is determined by the number of active periods the subscription is associated with. If an offer with a subscription length of 1 year is purchased on Jan. 1, 2002, for example, it can have an end date of Jan. 1, 2003. However, if on Jun. 1, 2002 the subscription is suspended and is re-enabled on Sep. 1, 2002, then the end date is adjusted to Mar. 1, 2003, in order that the active periods add up to initially determined subscription length. A subscription generally cannot be extended beyond its allowed number of active periods since the customer may not be charged the correct amount.

In a related aspect of the present invention, payment instruments defined to purchase services can have an associated status. The payment instrument status typically does not have transition rules associated with it. An internal method (API call) can be provided to change the payment instrument status. The payment instrument status can include a good status, wherein the payment instrument can then be employed to purchase services. Another type of status is "declined," wherein a last attempt to collect on the payment instrument was declined. The payment instrument cannot be utilized to purchase until it successfully authorizes, settles and/or remedies an outstanding overdue balance on the instrument. Another type instrument status is "disabled," whereby no new purchases can be achieved. This type of payment instrument having a disabled status is generally no longer charged.

Figure 10:
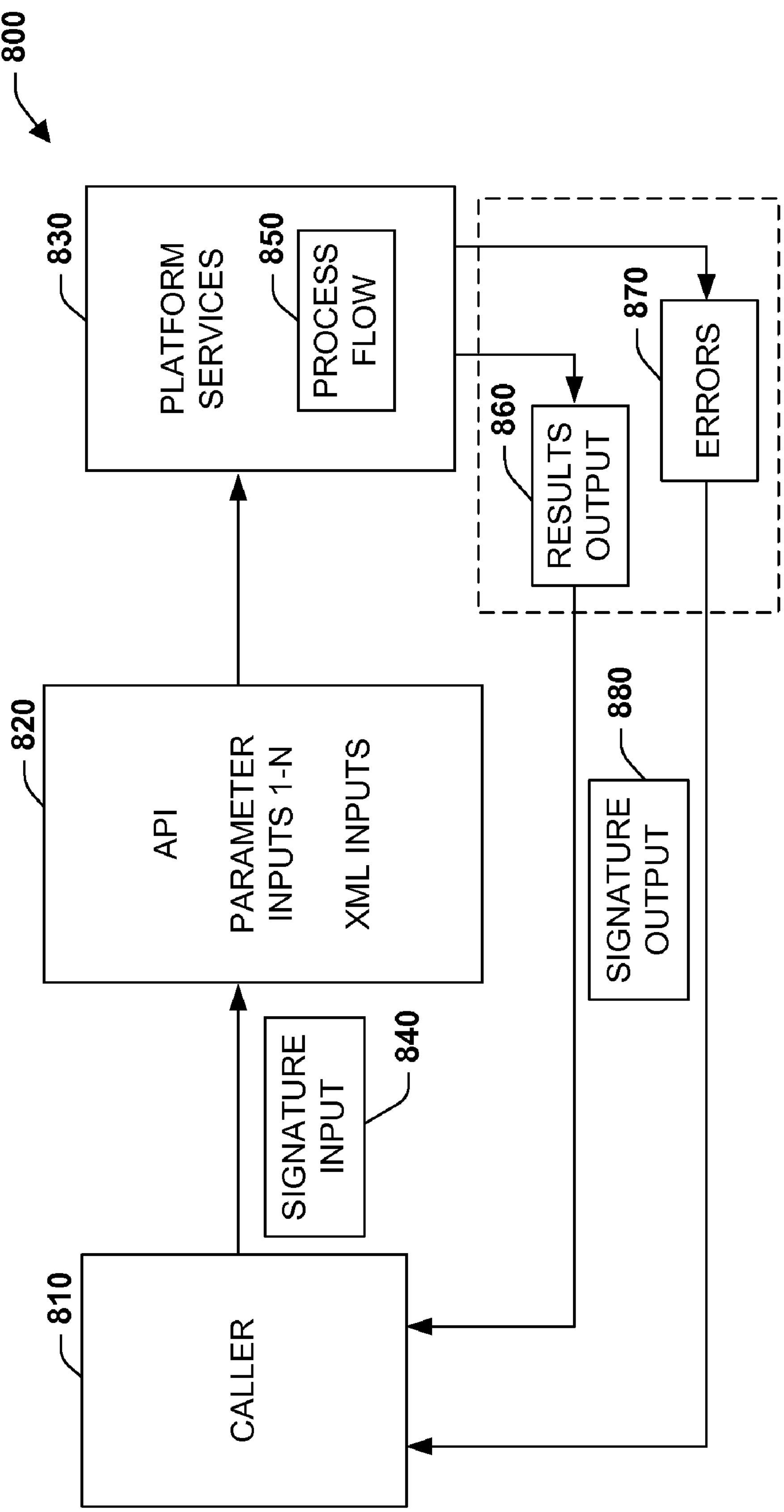
FIG. 10 is a diagram illustrating an API framework in accordance with an aspect of the present invention.

FIG. 10 illustrates a corresponding system 800 and framework within which the APIs are defined and are operative. At 810, a caller configures an API illustrated at 820. The API 820 can include one or more parameter inputs and one or more fields that are associated with respective XML configurations for a desired platform service operation at 830. The respective parameters and XML fields at 820 can further be defined by a signature input definition at 840 that describes parameter types and formats. The platform services at 830 perform the desired function defined by the caller 810 and API 820 that can include a process flow operation at 850 in furtherance of performing the desired function. After a desired function has been performed by the platform services at 830, a results output that can include XML fields is returned to the caller at 860. If an error is determined by the platform services, an errors result can be returned at 870 that can also include XML fields/definitions. As with the signature input definitions at 840, the results output 860 and errors output 870 can be further defined by a signature output describing returned output types and formats.

Figure 11:
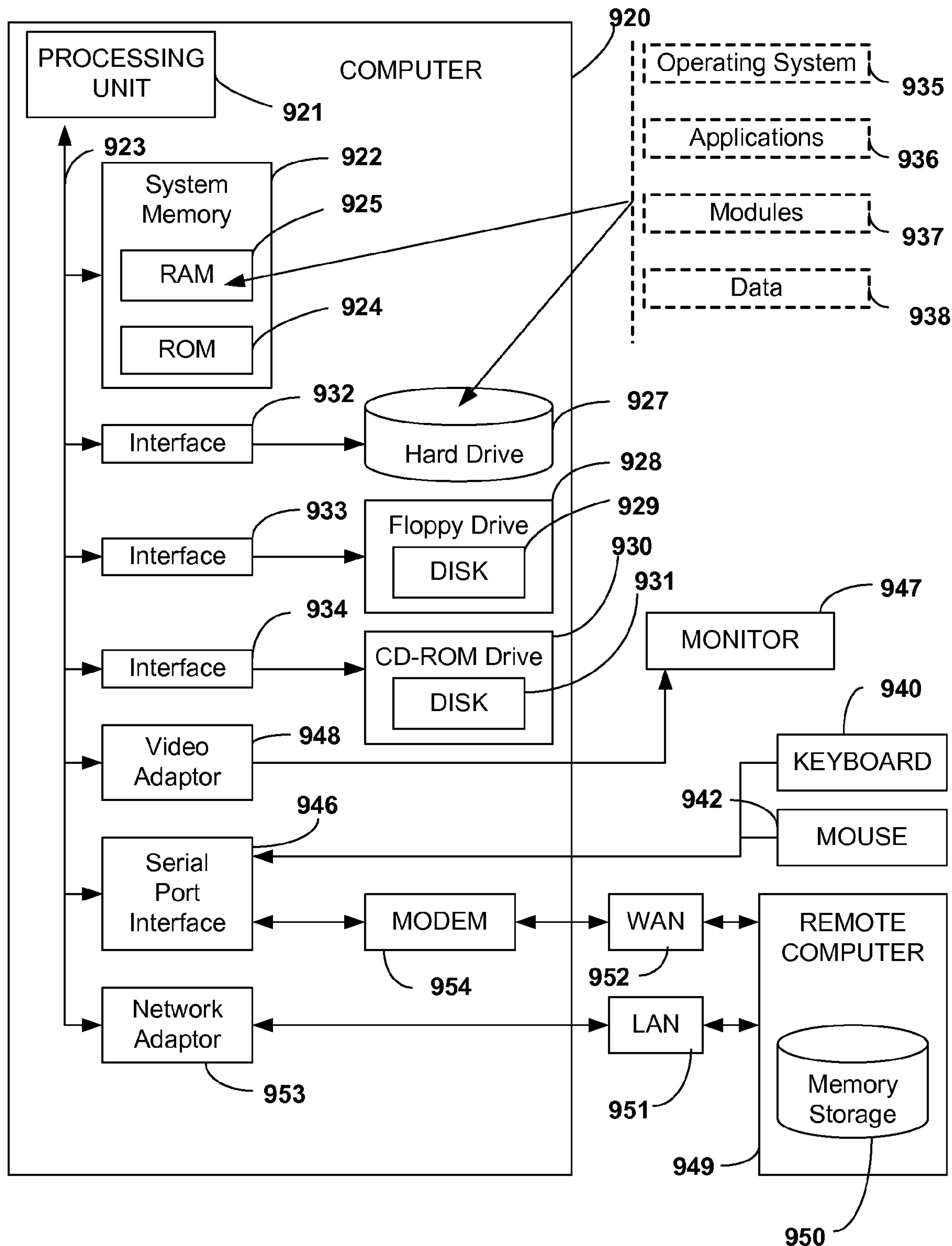
FIG. 11 is a schematic block diagram illustrating a suitable operating environment in accordance with an aspect of the present invention.

In order to provide a context for the various aspects of the invention, FIG. 11 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary system for implementing the various aspects of the invention includes a computer 920, including a processing unit 921, a system memory 922, and a system bus 923 that couples various system components including the system memory to the processing unit 921. The processing unit 921 may be any of various commercially available processors. It is to be appreciated that dual microprocessors and other multi-processor architectures also may be employed as the processing unit 921.

The system bus may be any of several types of bus structure including a memory bus or memory controller, a peripheral bus, and a local bus using any of a variety of commercially available bus architectures. The system memory may include read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading from or writing to a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 925, including an operating system 935, one or more application programs 936, other program modules 937, and program data 938. It is noted that the operating system 935 in the illustrated computer may be substantially any suitable operating system.

A user may enter commands and information into the computer 920 through a keyboard 940 and a pointing device, such as a mouse 942. Other input devices (not shown) may include a microphone, a joystick, a game pad, a satellite dish, a scanner, or the like. These and other input devices are often connected to the processing unit 921 through a serial port interface 946 that is coupled to the system bus, but may be connected by other interfaces, such as a parallel port, a game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 may operate in a networked environment using logical connections to one or more remote computers, such as a remote computer 949. The remote computer 949 may be a workstation, a server computer, a router, a peer device or other common network node, and typically includes many or all of the elements described relative to the computer 920, although only a memory storage device 950 is illustrated in FIG. 11. The logical connections depicted in FIG. 11 may include a local area network (LAN) 951 and a wide area network (WAN) 952. Such networking environments are commonplace in offices, enterprise-wide computer networks, Intranets and the Internet.

When employed in a LAN networking environment, the computer 920 may be connected to the local network 951 through a network interface or adapter 953. When utilized in a WAN networking environment, the computer 920 generally may include a modem 954, and/or is connected to a communications server on the LAN, and/or has other means for establishing communications over the wide area network 952, such as the Internet. The modem 954, which may be internal or external, may be connected to the system bus 923 via the serial port interface 946. In a networked environment, program modules depicted relative to the computer 920, or portions thereof, may be stored in the remote memory storage device. It can be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 920, unless otherwise indicated. Such acts and operations are sometimes referred to as being computer-executed. It can be appreciated that the acts and symbolically represented operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 929, and CD-ROM 931) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-implemented system to support online subscription services, comprising:

a platform that coordinates and manages a plurality of services provided by more than one service provider, wherein (1) the plurality of services offered for sale by at least one tenant and purchased by at least one customer, (2) the plurality of services are specified in a plurality of offerings, (3) the offerings include units of the services and a set of rules that define requirements to purchase the services, (4) the set of rules restrict eligibility of the services to a limited set of customers that match one of specified criteria, a particular language, a particular currency or payment methods, (5) the set of rules further defines processes for providing the services and rates for the services;

at least one processor that processes the set of rules in response to one or more events detected in connection with one of the offerings from the plurality of offerings, the one or more events include at least one of a pre-purchase event, a purchase event, a cancellation event, a renewal event or a conversion event; and a product catalog that includes event-to-rule mapping entries that define a subset of the set of rules to be processed in an occurrence of the one or more events, wherein a type of the subset corresponds to a type of the one or more events.

2. The system of claim 1, the at least one processor includes one of a qualification engine, and provisioning engine, or a ratings engine.

3. The system of claim 2, the at least one processor provides extendable rules and/or heuristics.

4. The system of claim 1, wherein the system operates independently of a given software platform or framework.

5. The system of claim 1, wherein the system is implemented utilizing one of a product catalog, a compiled approach, or a just-in-time compilation model.

6. The system of claim 1, wherein the system is a shared environment that is employed by multiple related and/or unrelated business entities.

7. The system of claim 6, wherein the system is configured such that the business entities and their associated data can be shielded from other business entities.

8. The system of claim 6, wherein offers configured by one of the business entities can be made available to other business entities.

9. The system of claim 1, further comprising an application program interface (API) that allows the respective business entities to interact with the subscription services platform.

10. The system of claim 1, wherein the subset of the set of rules that corresponds to the ratings event includes rules for processing non-currency resources.

11. The system of claim 10, wherein the noncurrency resources include online access time, points earned and size of email storage.

* * * * *